(12) United States Patent
Pickering et al.

(10) Patent No.: US 11,999,025 B2
(45) Date of Patent: Jun. 4, 2024

(54) SYSTEM AND METHOD FOR PROCESSING A WORKPIECE

(71) Applicant: Peddinghaus Corporation, Bradley, IL (US)

(72) Inventors: Nicholas Pickering, Chebanse, IL (US); Eric Simek, Wilmington, IL (US)

(73) Assignee: Peddinghaus Corporation, Bradley, IL (US)

(*) Notice: Subject to any disclaimer, the term of this patent is extended or adjusted under 35 U.S.C. 154(b) by 183 days.

(21) Appl. No.: 17/907,819

(22) PCT Filed: Apr. 8, 2020

(86) PCT No.: PCT/US2020/027158
§ 371 (c)(1),
(2) Date: Aug. 29, 2022

(87) PCT Pub. No.: WO2021/206702
PCT Pub. Date: Oct. 14, 2021

(65) Prior Publication Data
US 2023/0093693 A1  Mar. 23, 2023

(51) Int. Cl.
*B23Q 3/16* (2006.01)
*B23K 7/00* (2006.01)
(Continued)

(52) U.S. Cl.
CPC ............... *B23Q 3/16* (2013.01); *B23K 7/002* (2013.01); *B23Q 1/012* (2013.01); *B23Q 7/05* (2013.01)

(58) Field of Classification Search
CPC ... B23Q 3/00; B23Q 3/06; B23Q 3/16; B23Q 7/04
See application file for complete search history.

(56) References Cited

U.S. PATENT DOCUMENTS 3,977,804 A * 8/1976 Kitagawa ................ B23B 39/16
                                                      408/51
4,149,819 A * 4/1979 Kitagawa .............. B23B 41/003
                                                      408/70
(Continued)

FOREIGN PATENT DOCUMENTS

DE        9303271 U1    5/1993
EP        1437195 A1    7/2004
(Continued)

OTHER PUBLICATIONS

Written Opinion and Search Report dated Jul. 24, 2020 for PCT/US2020/027158 of which this is subject application a US National Phase indicating that all claims 1-24 possess novelty, inventive step, and industrial applicability.

*Primary Examiner* — Jacob J Cigna
(74) *Attorney, Agent, or Firm* — Wood, Phillips, Katz, Clark & Mortimer

(57) ABSTRACT

A system (40) is provided for processing a workpiece (44). The system (40) includes a support surface (48) for supporting the workpiece (44) and defining a processing path (P) along which the workpiece (44) may travel relative to the system (40). The system (40) includes at least one tool (64a, 64b, 64c) for performing a process on the workpiece (44) that is movable in a work zone (WZ) along a predetermined length (L) of the workpiece (44) in a direction along the processing path (P). The system (40) includes a movable clamp assembly (80) having opposing clamping pads (84, 88) movable into and out of the work zone (WZ) along the processing path (P) to clamp a portion of the workpiece (44) located in the work zone (WZ) prior to the at least one tool (64a, 64b, 64c) performing a process on the workpiece (44).

24 Claims, 9 Drawing Sheets

(51) Int. Cl.
*B23Q 1/01* (2006.01)
*B23Q 7/05* (2006.01)

(56) References Cited

U.S. PATENT DOCUMENTS

| | | | | |
|---|---|---|---|---|
| 4,179,230 | A * | 12/1979 | Kitagawa | B23B 41/003 408/46 |
| 4,215,958 | A * | 8/1980 | Jagers | B23B 41/003 408/51 |
| 5,781,983 | A * | 7/1998 | Gruner | B23Q 7/1494 409/164 |
| 7,490,710 | B1 * | 2/2009 | Weskamp | B23Q 7/1426 29/33 P |
| 2003/0110618 | A1 * | 6/2003 | Magnuson | B23Q 17/22 29/720 |
| 2005/0229754 | A1 * | 10/2005 | Nicaise | B23Q 1/76 82/127 |
| 2006/0045642 | A1 * | 3/2006 | Bosker | B23C 3/002 409/163 |
| 2017/0129039 | A1 * | 5/2017 | Williams | G06T 7/0004 |
| 2017/0209975 | A1 * | 7/2017 | Geissler | B23Q 39/024 |
| 2023/0093693 | A1 * | 3/2023 | Pickering | B23K 7/10 |

FOREIGN PATENT DOCUMENTS

| | | | |
|---|---|---|---|
| EP | 2926943 | A1 | 10/2015 |
| EP | 3932613 | A1 | 1/2022 |
| GB | 312537 | A | 5/1929 |

* cited by examiner

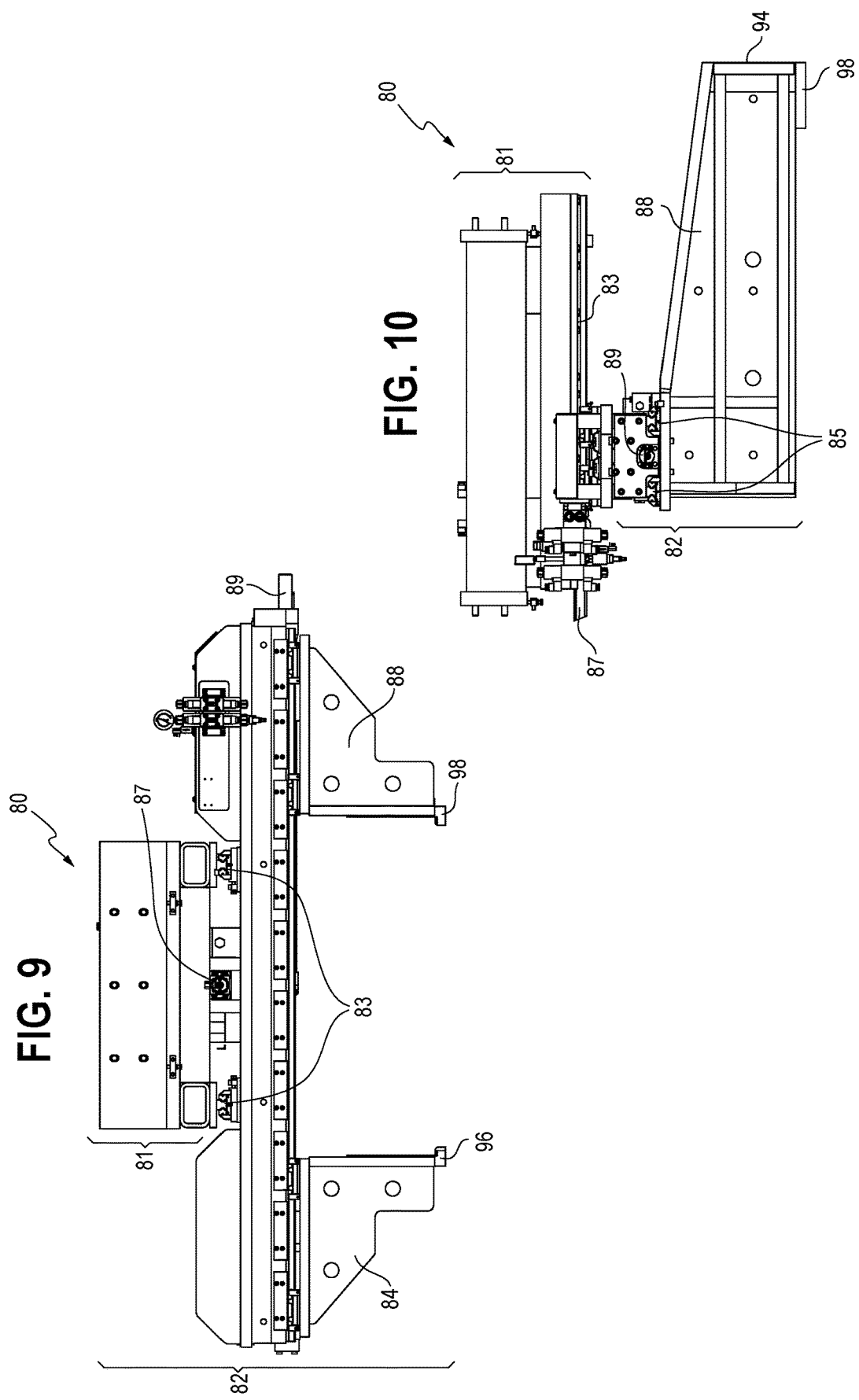

SYSTEM AND METHOD FOR PROCESSING A WORKPIECE

TECHNICAL FIELD

This invention relates to a system and method for processing of a workpiece. Such processing may involve conveying and severing a length of stock (including, for example, a piece of structural steel, wood, or other materials) into one or more shorter length segments, cutting, drilling, milling, punching holes, cutting profiles with a torch, layout marking, etc. More particularly, one aspect of this invention relates to a processing system equipped with a movable clamp assembly for use in a work zone of one or more processing tools of the system.

BACKGROUND OF THE INVENTION AND TECHNICAL PROBLEMS POSED BY THE PRIOR ART

Fabrication of a workpiece (such as, for example, a structural steel wide flange H-beam, angle, tube, channel, flat plate, etc.) may require layout marking, drilling, punching, and/or severing portions of the workpiece. Workpieces in the form of structural beams may have to be provided in appropriate lengths for being erected in specific structures. Methods for creating one or more shorter segments or beams from a length of stock include severing the shorter segments from the length of stock with a cutting torch or with a shearing apparatus. When beams are erected in structures, the ends of the beams and/or other portions of the beams are typically connected together with bolts. The bolts are received in holes provided in the webs and flanges of the beams.

Conventional systems or machines can perform one or more of these processing jobs or processes. For example, a machine can be used to drill holes in a workpiece while a separate machine can cut part of the workpiece with a cutting torch. Alternatively, in another type of system, the workpiece is moved through a series of tools (e.g., punches, drills, cutting torches, plasma marking torches, scribers, lasers, etc.) which are located at fixed locations along the length of the system.

In one type of system, a workpiece is supported lengthwise on, and clamped to, a support surface in the form of a table or roller conveyor that is adjacent to a tool mounted to a location on a frame. The length of the workpiece may be fed in a direction while resting on the support surface, and the relative movement of the workpiece and the system defines a processing path, such that a desired portion or length of the workpiece is adjacent to the tool for being processed by the tool. In such a system, the workpiece must be stopped at the appropriate location for processing, and then the workpiece is moved to the next location for processing by the same tool or another tool. If all of the processing can only take place at a single location in the system performing the processing, the workpiece must be stopped in the system multiple times at multiple positions to allow for all the processing to be completed.

It would be desirable if the workpiece could be processed by the system in a work zone (i.e., space, area, or volume) that is not located at a fixed point or relatively small region, but which extends some length along the workpiece wherein a tool could operate along at least a portion of the extended work zone to improve processing speed and overall throughput of the system. It would further be desirable for the system to have the capability to process multiple surfaces or sides of the workpiece simultaneously regardless of their location along the length of the workpiece within the work zone.

However, it has been found by the inventors that processing a workpiece in such a work zone may have a disadvantage in that the portion of the workpiece being processed in the work zone may not be sufficiently supported, especially for workpieces that are not sufficiently rigid (due to inherent material properties, thickness, and/or cross-sectional shape of the workpiece). For example, a workpiece in the form of a large structural steel beam is relatively very rigid and will be able to extend into the work zone with minimal deflection when subjected to one or more processes. In contrast, a workpiece in the form of a lighter weight steel beam may deflect significantly in the work zone as it is being processed. Furthermore, depending on the particular process, the workpiece in the work zone may deflect significantly enough to permanently deform it. For example, drilling and milling with large tooling introduces large tool pressure forces onto the workpiece. These tool pressures can cause the material to deflect significantly.

Therefore, it would be desirable to provide an improved system for processing a workpiece with improved processing time and throughput, and which eliminates, or at least substantially reduces, the likelihood of deformation or damage to a portion of a workpiece within a work zone during processing.

It would further be desirable to provide an improved system for processing a workpiece wherein the need for separate standalone machines is reduced or eliminated.

It would be especially beneficial if such an improved system could operate effectively with minimal maintenance in an environment that is dirty, and wherein drill chips and spray mist coolant might be thrown or dispersed around the workpiece.

It would also be desirable if such an improved system could be readily operated by an appropriate control system, could accommodate a variety of different types of workpieces (e.g., flat plates, channels, angles, H-beams, wood, pipe, etc.), could produce accurate and repeatable results, and could relatively easily accommodate changes in the types and sizes of the workpieces being processed.

Also, it would be beneficial if such an improved system could employ components that are small enough to relatively easily fit in an existing processing machine, system, or line.

It would further be beneficial if such an improved system could perform processing operations on one or more surfaces of a workpiece quickly and efficiently.

Further, it would be advantageous if the improved system could be manufactured, installed, and operated without incurring excessive costs or expenses.

SUMMARY OF THE INVENTION

The present invention provides a novel, improved system and method for processing a workpiece and that can accommodate designs having the above-discussed benefits and features.

According to one aspect of the invention, a system is disclosed for processing a workpiece. The system has a support surface for supporting a workpiece and defining a processing path along which a workpiece may travel relative to the system. The system includes one or more tools for performing a process on the workpiece. The tool or tools are movable in a work zone along a predetermined length of the workpiece in a direction along the processing path. The movable clamp assembly has at least a pair of opposing clamping pads, at least one of the pair of clamping pads is movable relative to the other one of the pair of clamping pads for clamping a portion of the workpiece located within the work zone of the tool or tools. The clamping pads are movable into and out of the work zone along the processing path whereby the movable clamp assembly is configured to move the clamping pads along the processing path into the work zone to clamp a portion of the workpiece located in the work zone prior to the tool or tools performing a process on the workpiece.

In another form of the invention, a property of the workpiece is used to determine a distance that the movable clamp assembly moves the clamping pads along the processing path into the work zone to clamp a portion of the workpiece located in the work zone prior to the tool or tools performing a process on the workpiece. In one preferred form, the property of the workpiece is at least one of a stiffness of the workpiece, an elastic modulus of a material of the workpiece, or a cross-sectional shape of the workpiece in a plane normal to the processing path.

In still another form of the invention, a force applied by the tool or tools while performing a process on the workpiece is used to determine a distance that the movable clamp assembly moves the clamping pads along the processing path into the work zone and clamp a portion of the workpiece located in the work zone prior to the at tool or tools performing a process on the workpiece.

According to another form of the present invention, at least one tool of the system is a drill tool.

According to another form of the present invention, at least one tool of the system is a cutting tool.

According to another form of the present invention, at least one tool of the system is a marking tool.

In yet another form of the present invention, the predetermined length of the work zone or work zones is preferably between about 250 millimeters and about 1000 millimeters. In another form of the present invention, the predetermined length is preferably about 500 millimeters.

In one form of the present invention, the movable clamp assembly is configured to move the clamping pads in a direction along the processing path out of the work zone subsequent to the tool or tools performing a process on the workpiece.

According to still another form of the present invention, the system includes a plurality of tools located adjacent to a plurality of surfaces of the workpiece located in the work zone.

In one form of the present invention, the tool is, or tools are, movable in directions along at least two orthogonal axes, and the tool is, or tools are, further movable in a direction substantially normal to the processing path.

According to form of the invention, the system includes three tools for performing processes on a workpiece. The three tools are movable within three substantially coextensive work zones along the predetermined length of the workpiece along the processing path.

In another aspect of the present invention, the system further includes a first roller feed clamp assembly for clamping a leading portion of the workpiece and a second roller feed clamp assembly for clamping a trailing portion of the workpiece, and the movable clamp assembly is located along the processing path between the first and second roller feed clamp assemblies.

In still another aspect of the present invention, the support surface does not extend into the work zone and each one of the pair of opposing clamping has the form of an elongate plate that defines a distal end. In another preferred form of the invention, each distal end includes a support extending laterally inwardly toward the processing path.

According to yet another aspect of the present invention, one of the pair of opposing clamping pads is spaced further from the processing path than the other one of the pair of opposing clamping pads.

In another form of the present invention, the movable clamp assembly includes a stationary first portion connected to a movable second portion by a first set of linear rails. The pair of opposing clamping pads are connected to the movable second portion by a second set of linear rails extending in a direction normal to the first set of linear rails. In one presently preferred form of the invention, the movable second portion is hydraulically movable relative to the stationary first portion in a direction along the processing path, and the pair of opposing clamping pads are hydraulically movable relative to one another in a direction normal to the processing path.

According to one broad form of the invention, a movable clamp assembly is provided for use, installation, integration with a system for processing a workpiece. The system is of the type having a support surface for supporting a workpiece and defining a processing path along which the workpiece may travel relative to the system. The system is of the type having at least one tool for performing a process on the workpiece and which is movable in a work zone along a predetermined length of the workpiece in a direction along the processing path. The movable clamp assembly includes at least a pair of clamping pads, at least one of the pair of clamping pads is movable relative to the other one of the pair of clamping pads for clamping a portion of the workpiece located within the work zone of the at least one tool. The clamping pads are movable into and out of the work zone along the processing path. The movable clamp assembly is configured to move the clamping pads along the processing path into the work zone to clamp a portion of the workpiece located in the work zone prior to the at least one tool performing a process on the workpiece.

In still another form of the invention, a method of processing a workpiece is disclosed. The method includes the step of acquiring or otherwise obtaining any of the aforementioned inventive systems. The method includes the step of loading a workpiece onto the support surface. The method includes the step of moving the workpiece along the processing path to locate a portion of the workpiece in the work zone. The method includes a further step of moving the clamping pads along the processing path to locate at least part of the clamping pads in the work zone. The method includes the step of moving at least one of the clamping pads relative to the other one of the clamping pads to clamp the portion of the workpiece located in the work zone. The method includes the step of performing a process with the at least one tool on the portion of the workpiece clamped in the work zone.

In one preferred form of the invention, the step of moving the clamping pads into the work zone is dependent upon a property of the workpiece. In a more preferred form of the present invention, the property of the workpiece includes at least one of a stiffness of the workpiece, an elastic modulus of a material of the workpiece, or a cross-sectional shape of the workpiece in a plane normal to the processing path.

In one preferred form of the invention, the step of moving the clamping pads into the work zone is dependent upon the process to be performed by the tool or tools.

In another form of the present invention, the step of moving at least one of the clamping pads relative to the other one of the clamping to clamp the portion of the workpiece includes engaging the clamping pads with less than the entire length of the portion of the workpiece that is located in the work zone.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 shows a workpiece (in phantom lines) resting on a support surface of the system;

FIG. 3 shows a fragmentary portion of a workpiece located within a work zone of one or more processing tools of the system, and FIG. 3 omits various minor components to reveal underlying details;

FIG. 4 shows the movable clamp assembly moved into the work zone to clamp the fragmentary portion of the workpiece located within the work zone;

FIG. 9 is a rear elevation view of major components of the movable clamp assembly shown in FIG. 5, taken along the plane 9-9 in FIG. 7; and FIG. 10 is a right-side elevation view of major components of the movable clamp assembly shown in FIG. 5, taken along the plane 10-10 in FIG. 7.

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the machine or system operating in accordance with this invention is described in the normal (upright) operating position, and terms such as above, below, left, right, etc., are used with reference to this position. It will be understood, however, that the system of this invention may be manufactured, stored, transported, used, and sold in an orientation other than that described.

The system operating in accordance with the process of this invention can have certain conventional components and control mechanisms the details of which, although not fully illustrated or described, will be apparent to those having skill in the art and an understanding of the necessary functions of such components and mechanisms.

Some of the Figures illustrating an embodiment of the system operating in accordance with the present invention show conventional structural details and mechanical elements that will be recognized by one skilled in the art. However, the detailed descriptions of such elements are not necessary to an understanding of the invention, and accordingly, are herein presented only to the degree necessary to facilitate an understanding of the novel features of the present invention.

Figure 1:
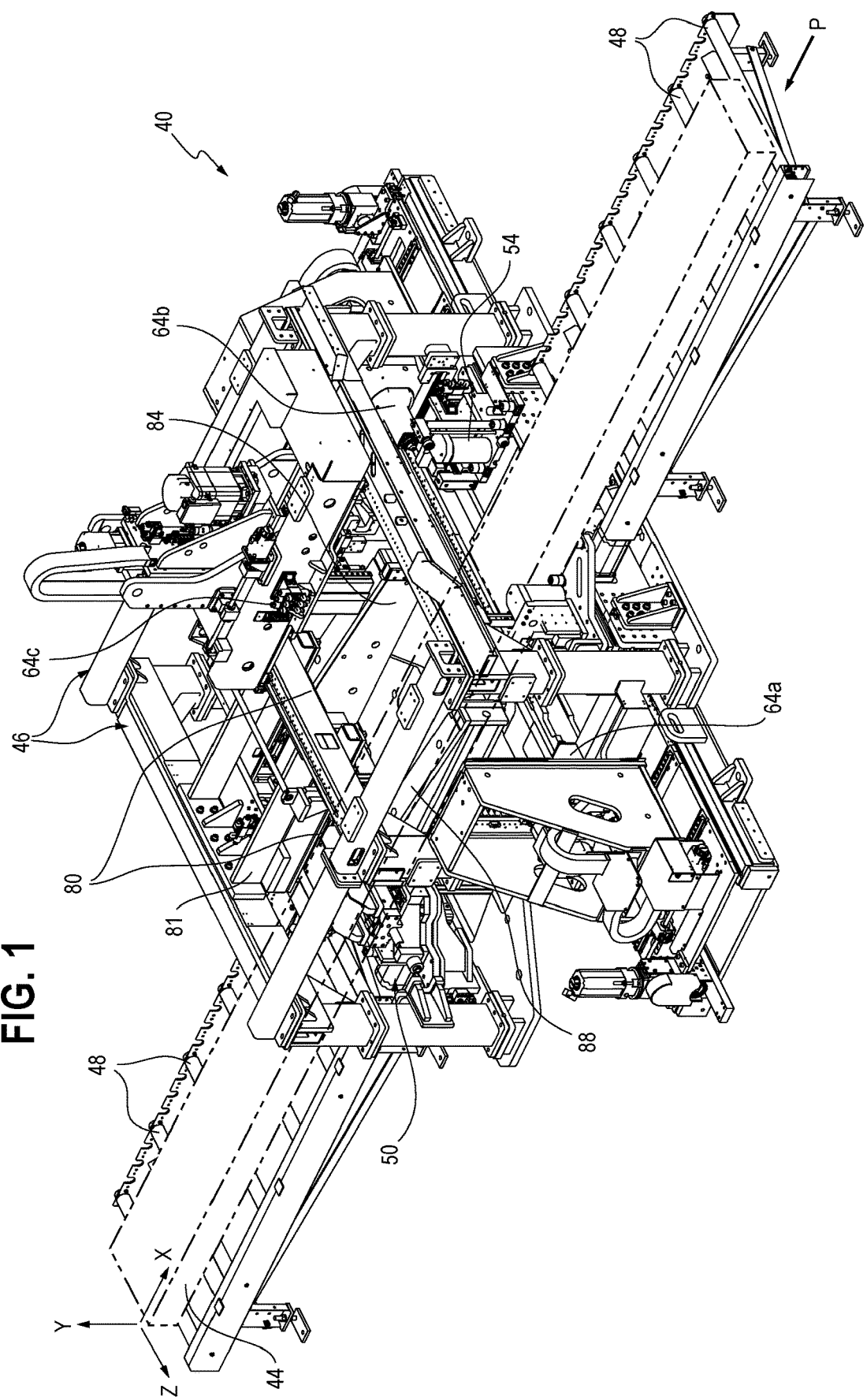
FIG. 1 is an isometric view, taken from above, of a system according to the present invention for processing a workpiece.

FIG. 1 shows a machine or system 40 according to the present invention for processing a workpiece, which is illustrated as a length of solid material having a rectangular cross-section along its length. The workpiece 44 could be a structural steel beam, light weight metal, wood, pipe, composite, or any elongate material.

Figure 2:
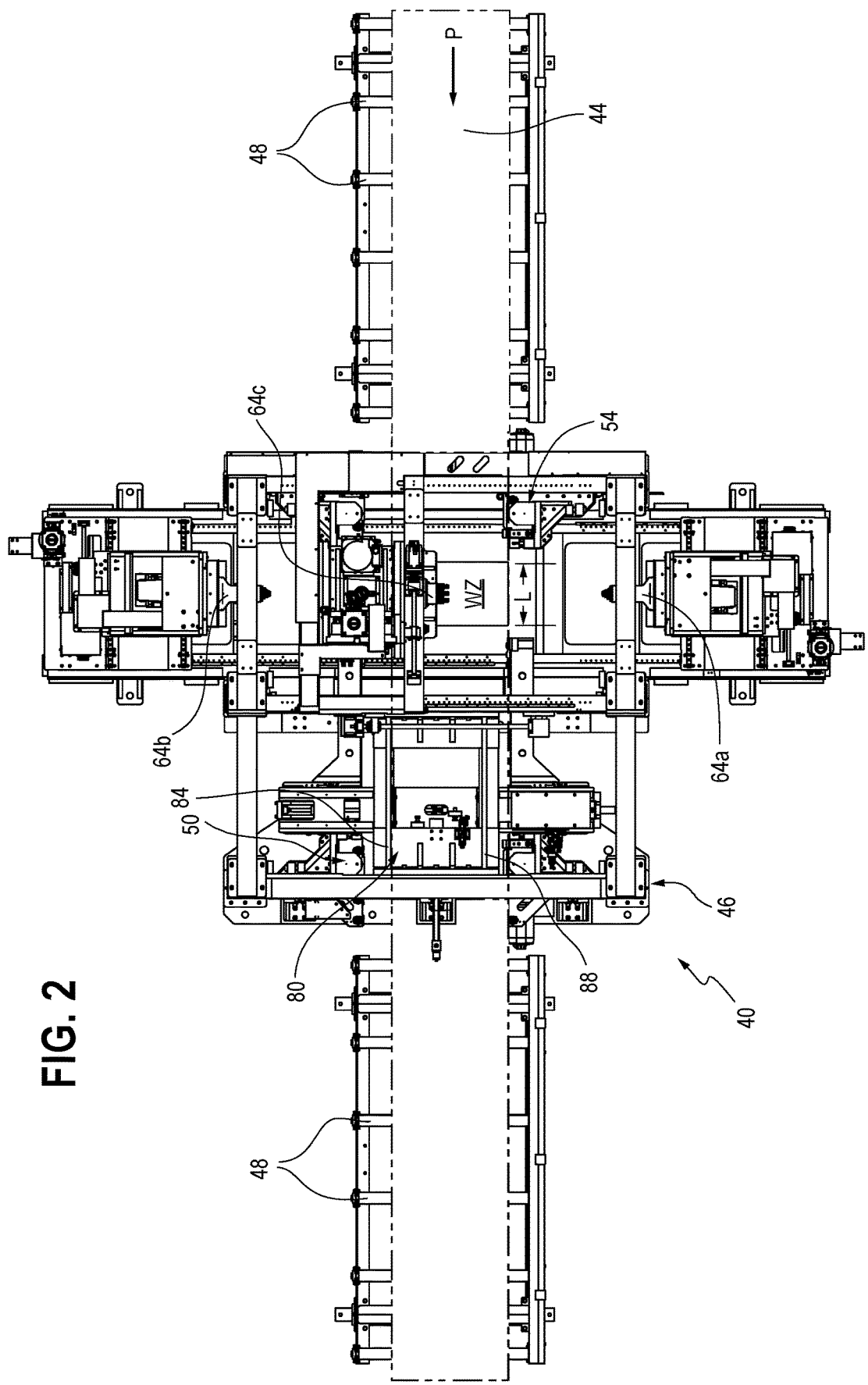
FIG. 2 is a top plan view of the system and workpiece shown in FIG. 1.

Referring to FIGS. 1 and 2, for ease of illustration some of the ancillary electrical wiring, hydraulic hosing, and other connections of the system 40 have been omitted. The system 40 includes a support surface 48 in the form of a roller conveyor defining a plurality of spaced-apart, parallel rollers and upon which a length of a workpiece 44 can be initially positioned by a forklift, conveyor, transfer table, crane or other means.

Still referring to FIGS. 1 and 2, the support surface 48 has an outlet end for receiving a leading end or portion of the workpiece 44 and having a first roller feed clamp assembly 50 for clamping a portion of the workpiece 44 at the outlet end of the system 40, an inlet end having a second roller feed clamp assembly 54 for clamping a portion of the workpiece 44 at the inlet end of the system 40. The system 40 generally defines a processing path "P", or generally horizontally-extending centerline, that extends from the inlet end to the outlet end for conveying the workpiece 44 for processing at a selected location along the length of the workpiece 44. The first and second roller feed clamp assemblies 50 and 54 are preferably hydraulically actuated for holding a workpiece at a fixed location along a datum line with respect to a gantry or frame 46 and also for indexing or feeding the workpiece 44 forward and rearward along the processing path "P" as needed. Each of the roller feed clamp assemblies 50 and 54 includes a stationary first clamping surface and a movable second clamping surface that is hydraulically movable toward the first clamping surface. Specifically, the second clamping surface is movable laterally in a direction that is generally perpendicular or normal to the processing path "P" (FIG. 2). The first and second clamping surfaces are vertical rollers that are located on the left and right sides of the processing path "P", one or both of which may be driven or otherwise actuated. With a workpiece 44 clamped between the first and second clamping surfaces or rollers, a measuring wheel or encoder wheel (not visible in FIGS. 1 and 2) of the system 40 makes rolling contact against a surface of the workpiece 44 to precisely measure the length of the workpiece 44 against the datum while moving the workpiece 44 forward or rearward along the processing path "P" atop the support surface 48 so as to determine the precise location of the workpiece 44 in the system 40. The encoder wheel may be comprised of a spring-loaded wheel and a rotational encoder sensor. The spring loading of the encoder wheel ensures that the encoder wheel stays in constant contact with a surface of a workpiece 44. Although not illustrated, the system 40 may include any number of additional means for precisely locating a workpiece within the system 40 and may have one or more laser switches or sensors and associated reflectors or touch sensors configured to detect the location of a leading end and/or trailing end of the workpiece 44 as it moves into, through, and out of the system 40.

It will be understood that the support surface 48 may be any suitable conventional or special structure capable of supporting a workpiece (e.g., the roller type conveyer as illustrated, a belt conveyor, a non-movable surface, etc.), and the support surface may be driven by any conventional or special means, such as by an electric motor, hydraulics, pneumatics, engine, etc. While the processing path "P" of the illustrated preferred embodiment of the system 40 is shown as substantially straight and extending along a substantially flat plane, it will be understood that the processing path "P" may be inclined, declined, curved, angled, or irregularly shaped in any of two or three dimensions.

Referring to FIGS. 1 and 2, the frame 46 of the system 40 extends laterally on either side of, above, and below the support surface 48. As will be discussed in greater detail hereinafter, the frame 46 supports a number of processing tools 64a, 64b, and 64c that are able to perform a process on a portion or length "L" of a workpiece 44 within a work zone "WZ". The length "L" of the work zone "WZ" is preferably between about 250 millimeters and about 1,000 millimeters, and the length "L" is more preferably about 500 millimeters.

While the particular embodiment of the system 40 illustrated has two opposing tools 64a and 64b in the form of drill spindles, with one drill spindle tool 64a arranged on a left side of the processing path "P" of the support surface 48 (as viewed from the inlet end and looking toward the outlet end of the system 40), one drill spindle tool 64b arranged on a right side of the of the processing path "P" of the support surface 48, and one vertical drill spindle tool 64c arranged above the support surface 48, it will be understood that the system 40 may have a greater or lesser number of tools, or different tools entirely. For example, the system 40 may be provided with a tool (not illustrated) that is located beneath the processing path "P" for performing a process on a bottom side of the workpiece 44. Furthermore, the system 40 may be provided with coping or cutting tools, punch presses, gas or plasma cutting torches, plasma or mechanical marking tools, lasers, etc. The system 40 may utilize a plasma torch tool that is an ArcWriter low power plasma marking torch manufactured by Hypertherm, Inc. having facilities at 21 Great Hollow Road, Hanover, NH 03755, USA. It will be understood that in some applications, other conventional or special plasma torches could be used in the plasma torch tool, such as a high voltage plasma cutting torch or oxygen-acetylene torch for severing a portion of a workpiece 44.

Furthermore, the system 40 may be provided with multiple work zones "WZ" at different lengths or distances along the processing path "P" of the system 40 in some embodiments (not illustrated). In the preferred embodiment of the system 40, the tools 64a, 64b, and 64c share substantially identically sized, coextensive work zones "WZ" that constitute a single work zone "WZ". In other embodiments (not illustrated), the work zone "WZ" of a first tool of the system 40 need not be identical in size or at the same location (coextensive along the path "P") as the work zone "WZ" of a second tool of the system 40.

While the work zone "WZ" of the illustrated embodiment of the system 40 is an unsupported area without a support surface 48, the support surface 48 could extend into part or all of a particular tool's work zone "WZ" in some alternative embodiments (not illustrated).

In one form of the system 40, the drill spindles of the tools 64a, 64b, 64c may utilize a 25 HP/18.5 kW smart spindle motor manufactured by Siemens having offices at Wittelsbacherplatz 2, Munich, Germany 80333. Other special or conventional drill spindle motors may be used. Each of the tools 64a, 64b, and 64c is movable via an electronically powered lead screw along two orthogonal axes (e.g., X-Y or X-Z) in the work zone "WZ", while the tools 64a, 64b, and 64c may also move normal to, toward and away from, the workpiece surface. Other means of movement may be used such as hydraulics, pneumatics, gears, solenoids, etc., to move the tools 64a, 64b, and 64c relative to the workpiece surfaces. In some applications, the tools 64a, 64b, and/or 64c may have additional degrees of freedom of movement relative to the surface or surfaces of the workpiece 44. For example, any of the tools 64a, 64b, and 64c may be carried at the operative end of a multi-axis (e.g., six axis) robot arm or industrial robot having plurality of independently movable members, each rotatable about an axis by an electric motor. The distal-most movable member terminates in an end effector for receiving any one of a drill tool, plasma marking torch, oxygen acetylene torch, milling tool, etc. The industrial robot may be any suitable conventional or special multi-axis or industrial robot, such as those manufactured by Kuka AG, FANUC, DENSO, and others. Basic design and control of such robots are described generally in U.S. Pat. Nos. 5,550,953 and 8,367,970, each of which is incorporated by reference in its entirety. However, as discussed in greater detail hereinafter, the illustrated preferred embodiment of the system 40 may more quickly perform a process on a workpiece 44, including multiple processes on multiple surfaces at the same time within the work zone "WZ", for a much lower cost than a conventional multi-axis robot arm or arms.

Figure 3:
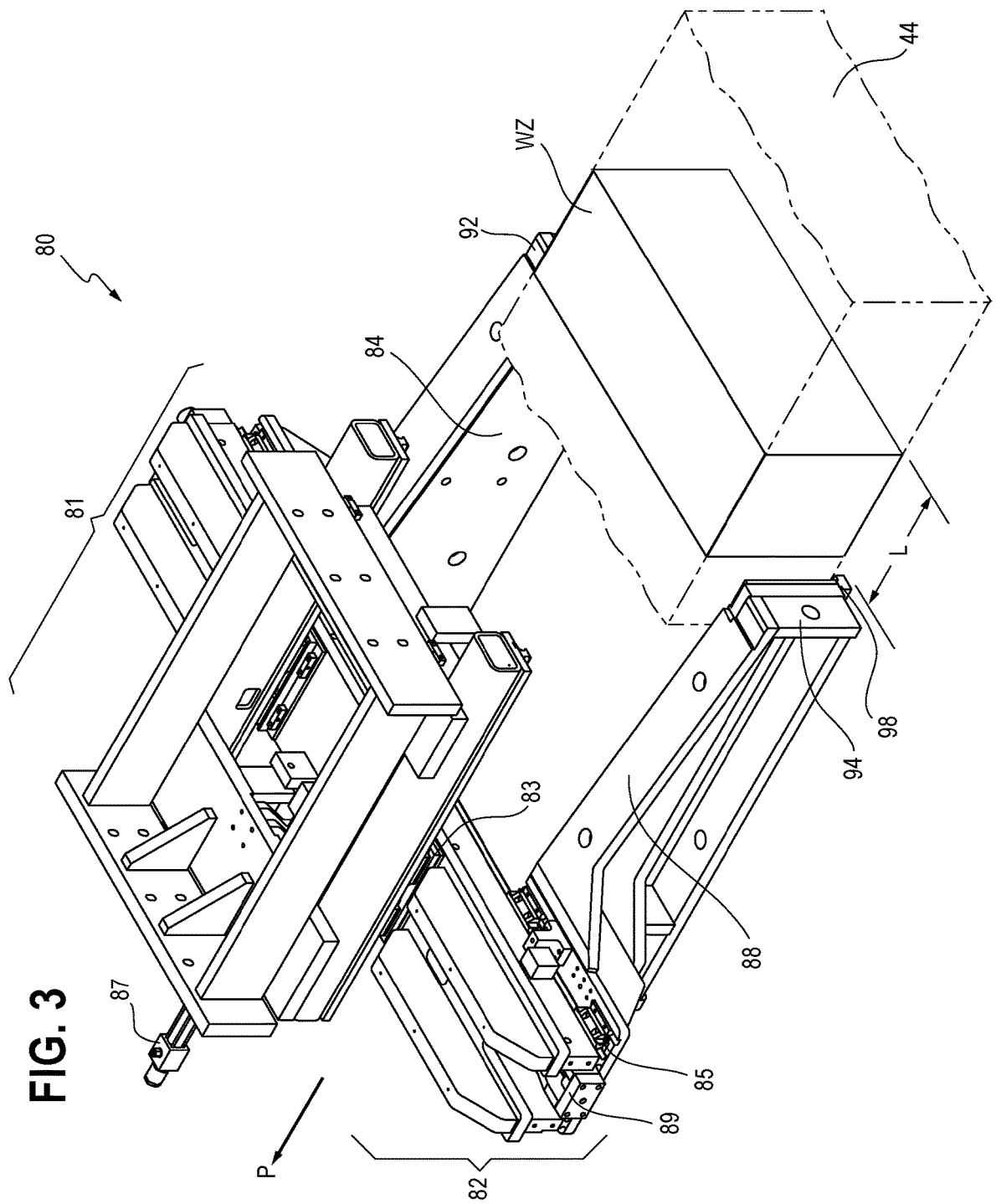
FIG. 3 is an isometric view, taken from above, of major components of a movable clamp assembly of the system of FIG. 1.
Figure 4:
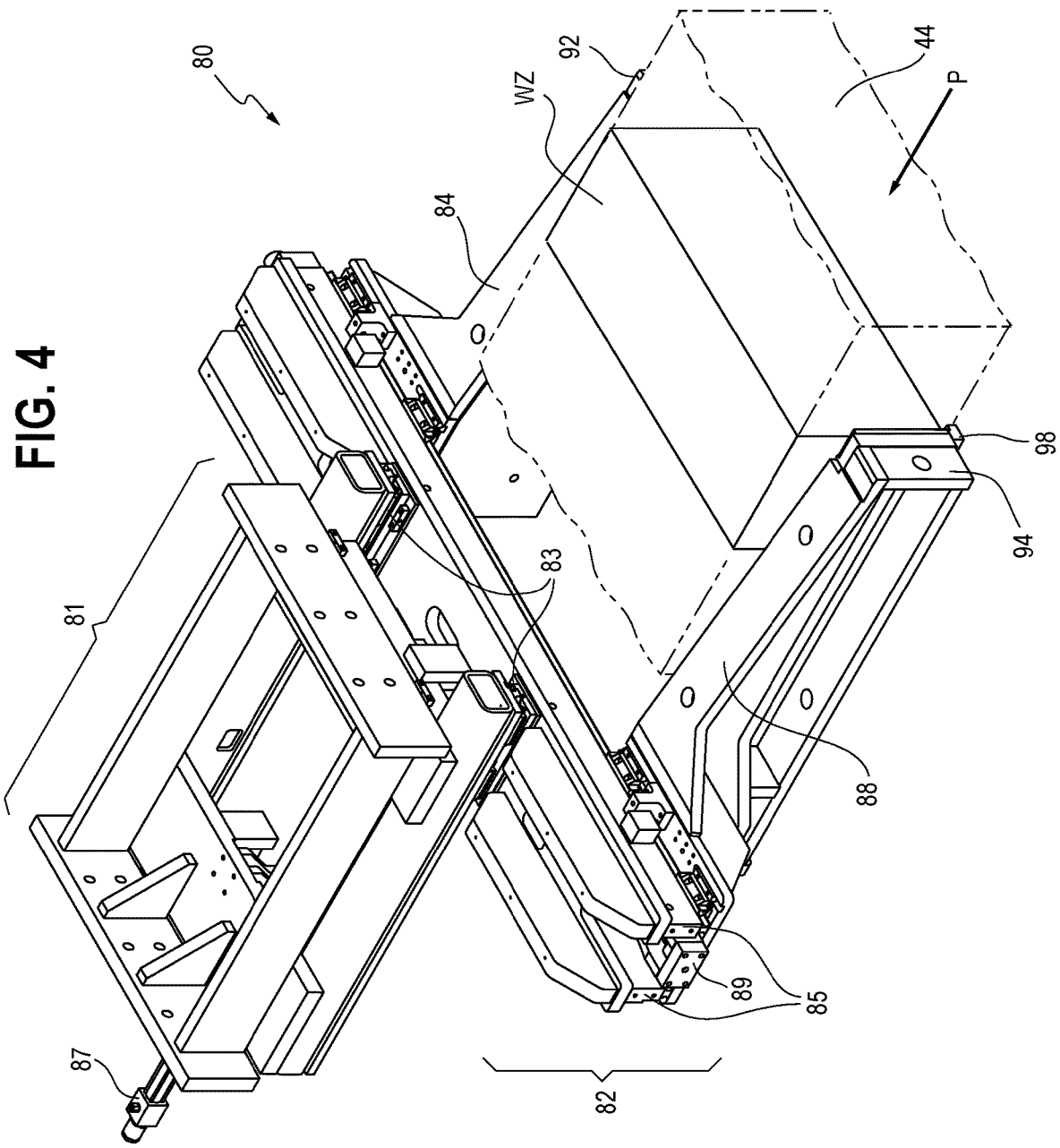
FIG. 4 is an isometric view, taken from above, of the major components of the movable clamp assembly of FIG. 3.
Figure 6:
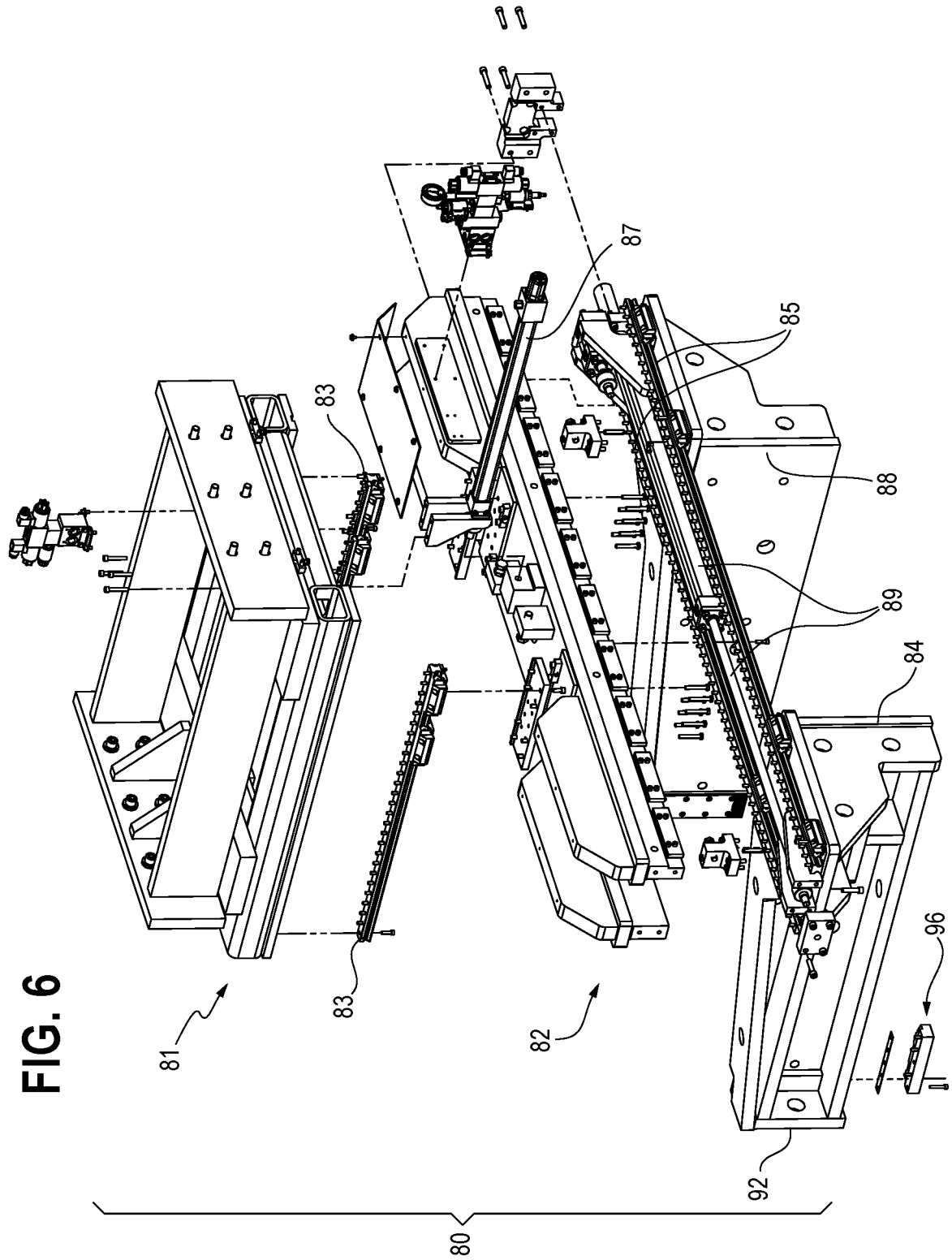
FIG. 6 is an exploded, isometric view, taken from above, of major components of the movable clamp assembly shown in FIG. 5, and the viewpoint of FIG. 6 is rotated about 90 degrees from the viewpoint of FIG. 5.
Figure 7:
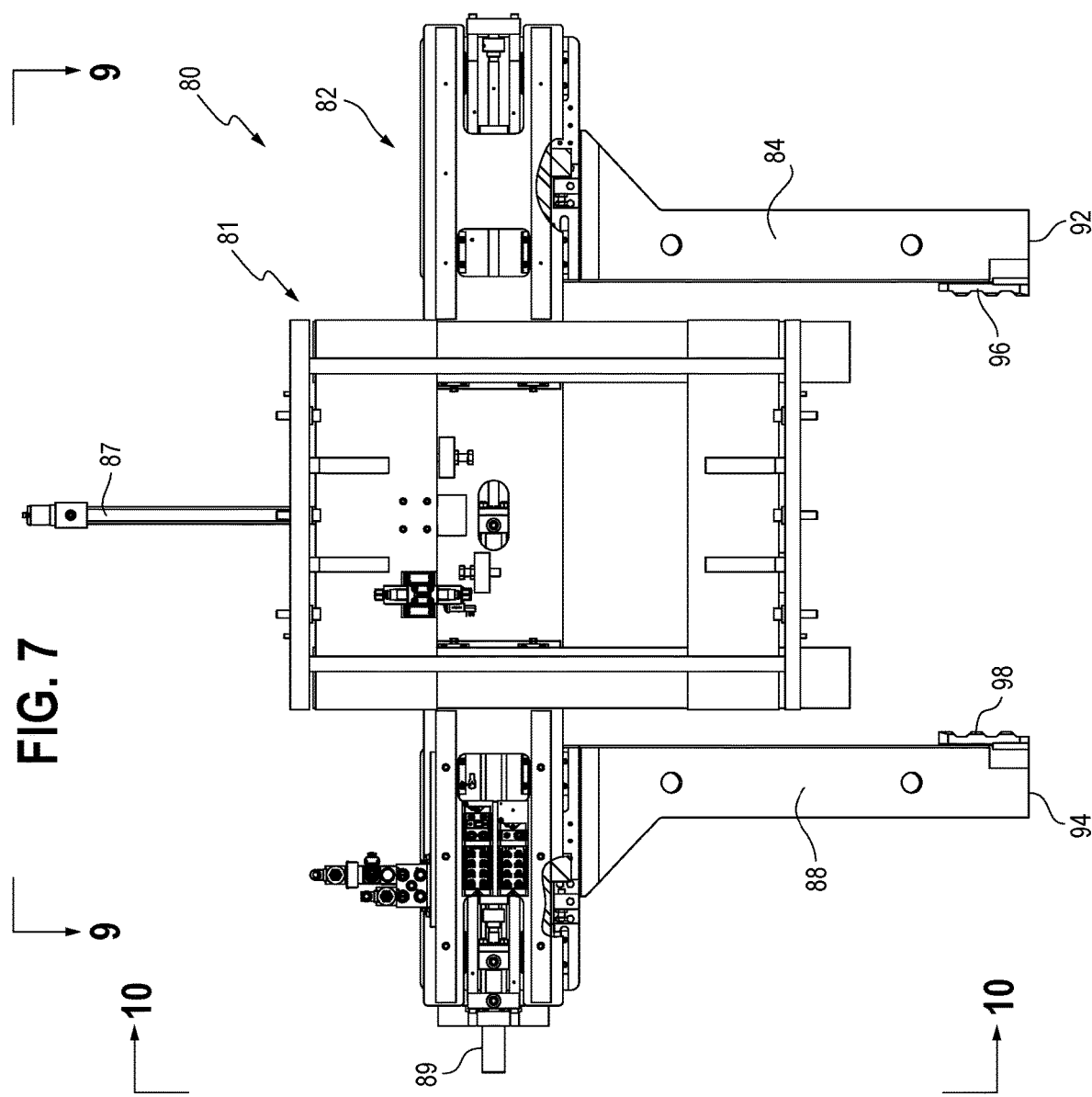
FIG. 7 is a top plan view of major components of the movable clamp assembly shown in FIG. 5.
Figure 8:
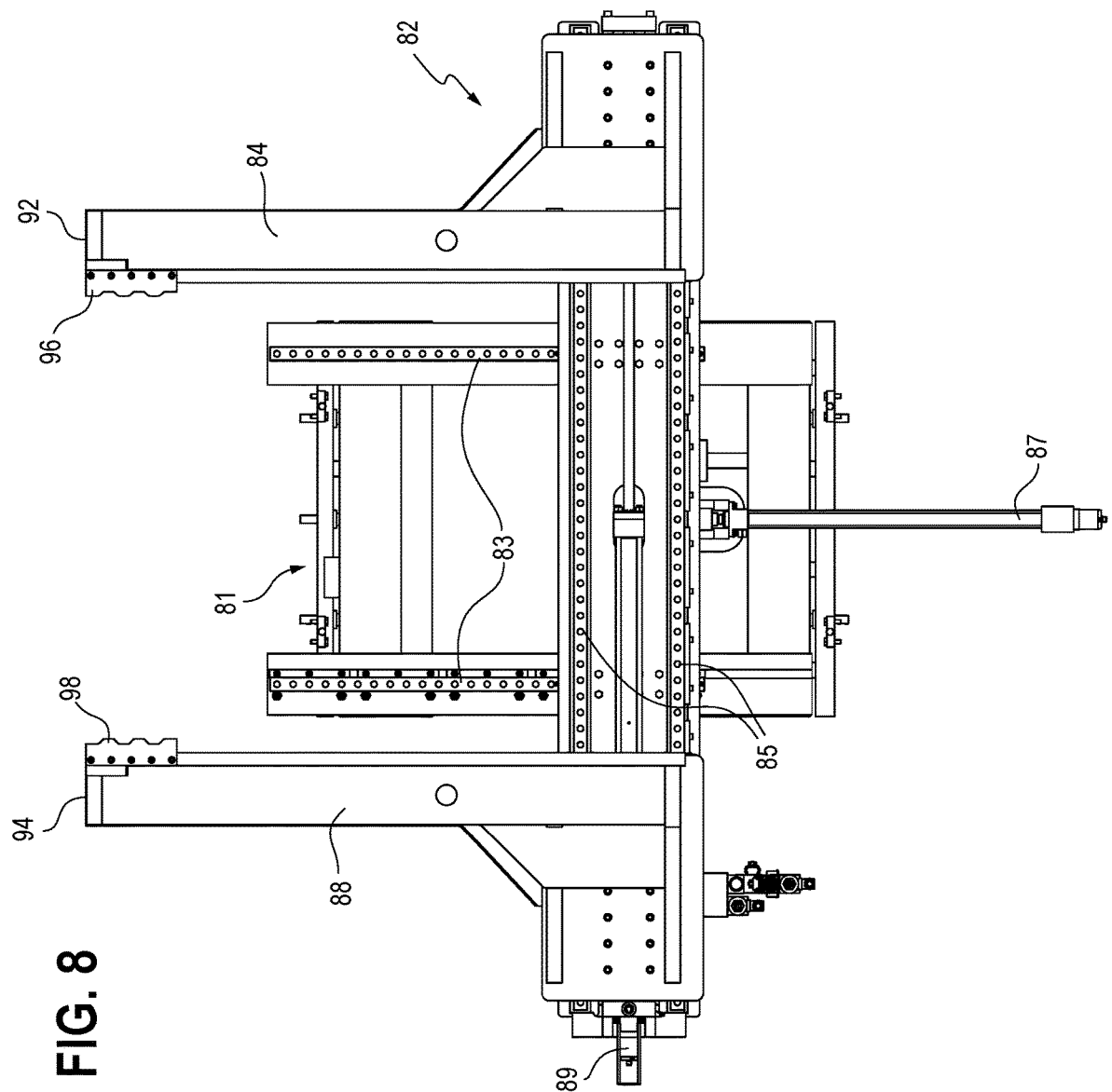
FIG. 8 is a bottom plan view of major components of the movable clamp assembly shown in FIG. 5.

With reference to FIGS. 1, 3, and 4, the system 40 is provided with a movable clamp assembly 80. As will be discussed in greater detail hereinafter, a portion of the movable clamp assembly 80 is configured to extend along the processing path "P" into some length, region, volume, or portion of the work zone "WZ" to clamp at least a portion of the work piece 44 that is located in the work zone "WZ" in preparation for one or more processes being performed by one or more of the processing tools 64a, 64b, and/or 64c in the work zone "WZ" of the particular tool or tools. The movable clamp assembly 80 includes a stationary first portion 81 that is fixed or secured to the frame 46 (visible in FIG. 1) of the system 40. The movable clamp assembly 80 further includes a movable second portion 82 that is movable relative to the stationary first portion 81 in either direction (i.e., forward or backward) along the processing path "P" into and out of the work zone "WZ". The movable clamp assembly portions 81 and 82 are connected by a first set of linear rails or slides 83 (best viewed in FIG. 6), and relative movement between the portions 81 and 82, in either direction along the processing path "P", is powered by a hydraulic actuator or cylinder 87 fixedly mounted to the first portion 81 of the clamp assembly 80. Other means may be used to move the movable clamp assembly portions 81 and 82 relative to one another, such as an electronically powered lead screw, pneumatic actuator, gears, solenoids, etc. As will be discussed in greater detail hereinafter, the movement of the movable clamp assembly portions 81 and 82 into and out of the work zone "WZ" is effected programmatically using hydraulic valves and a linear transducer to monitor position relative to the datum. This allows the movable clamp assembly portions 81 and 82 to be positioned at precisely the desired location within the work zone "WZ".

Referring to FIGS. 3 and 4, the movable clamp assembly 80 includes a pair of opposing clamping pads 84 and 88 which are connected to the aforementioned movable second portion 82 by a second set of slides or linear rails 85 extending in a direction normal to the first set of linear rails 83. Relative movement between the clamping pads 84 and 88, toward or away from one another, is powered by a hydraulic actuator or cylinder 89 fixedly mounted to the second portion 82 of the clamp assembly 80. Other means may be used to move the clamping pads 84 and 88 of the movable clamp assembly 80 relative to one another, such as an electronically powered lead screw, pneumatic actuator, gears, solenoids, etc. In alternative embodiments (not illustrated), only one clamping pad 84 or 88 could be movable relative to the other clamping pad 84 or 88.

Figure 5:
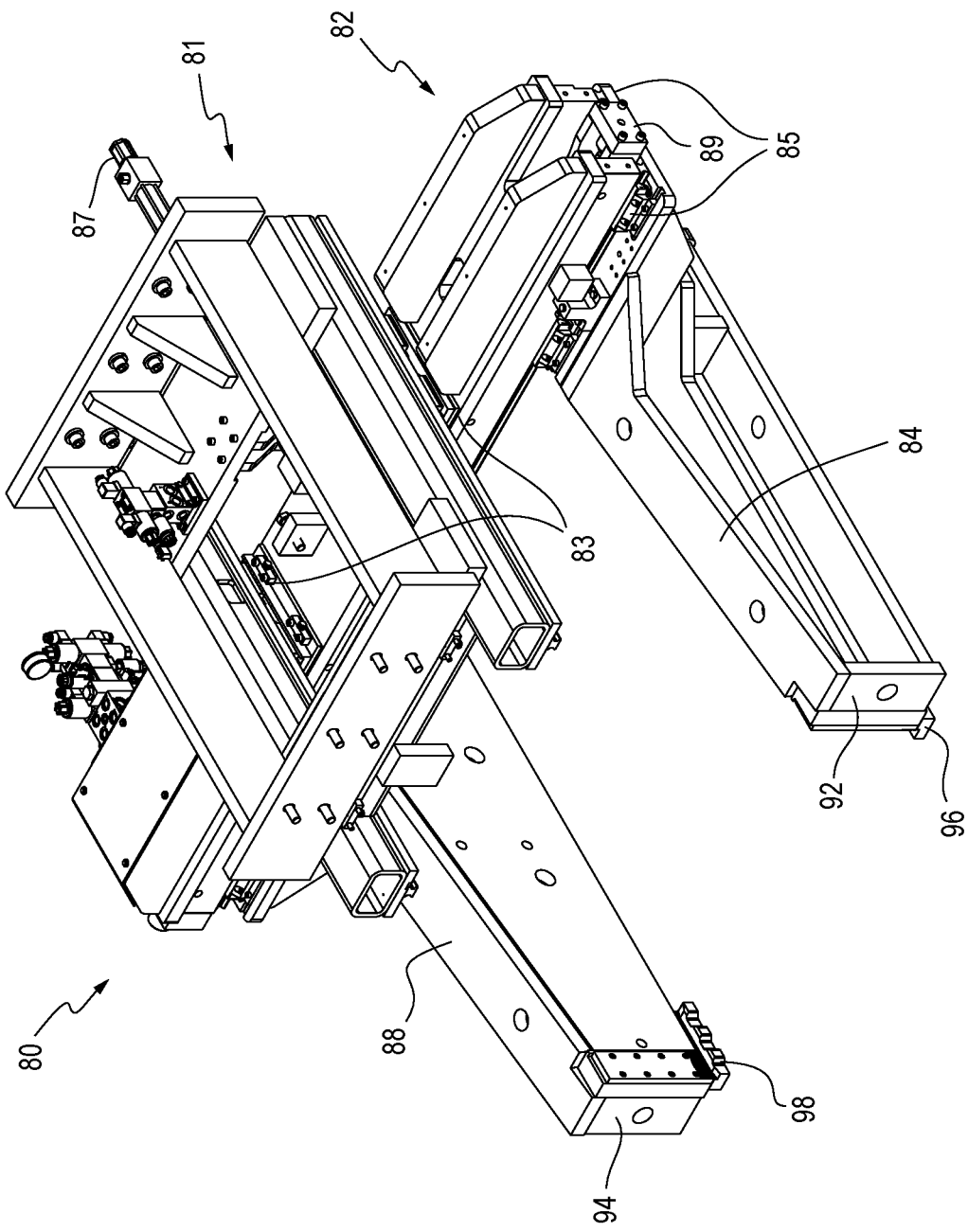
FIG. 5 is an isometric view, taken from above, of major components of the movable clamp assembly, but compared to FIG. 3, omits the workpiece and shows some additional components and details, and the viewpoint of FIG. 5 is rotated about 90 degrees from the viewpoint of FIG. 3.

Referring now to FIG. 5, each of the clamping pads 84 and 88 has the form of a generally vertical and substantially flat plate defining a proximal end connected at the rails 85, and defining a cantilevered, distal end—end 92 on pad 84, and end 94 on pad 88. The distal ends 92 and 94 are provided with a lower ledge or support 96 and 98, respectively, that each extends laterally inwardly toward the processing path "P" for supporting a bottom portion of the workpiece 44 in the work zone "WZ" when the clamping pads 84 and 88 are in engagement with surfaces of the workpiece 44.

It will be understood that the movable clamp assembly 80 need not be limited to two opposing clamping pads 84 and 88, and the movable clamp assembly 80 may be provided with three or more clamping pads (not illustrated) for some applications such as for clamping against a portion of an elongate pipe or any curved or irregularly shaped elongate workpiece.

In some applications (not illustrated), the movable clamp assembly 80, or subcomponents thereof such as the movable portion 82 and/or the clamping pads 84 and 88, may have additional degrees of freedom of movement. For example, if the processing path "P" of the system 40 were inclined, declined, curved, angled, or irregularly shaped in any of two or three dimensions, then the movable clamp assembly, or subcomponents thereof, would be configured to be movable along such a path into some portion of the length of the work zone "WZ".

With reference to FIGS. 1 and 2, it can be seen that the movable clamp assembly 80 and the work zone "WZ" are both located between the first roller feed clamp assembly 50 and the second roller feed clamp assembly 54 along the processing path "P".

For ease of illustration, some of the ancillary electrical wiring and hydraulic hosing of the movable clamp assembly 80 have been omitted in the FIGS. 3-10. The function of some of the minor components of the movable clamp assembly 80, such as bearings, bolts, bushings, pins, washers, valves, etc., while not described in detail, will be understood by one of ordinary skill in the art.

A control application for the system 40 preferably is, or includes, a single software program that controls all operational aspects of the system 40 including the programmable logic controller system, the roller feed system for feeding the workpiece along the processing path "P", the movement and operation of the tools 64a, 64b, 64c, the movable clamp assembly 80, the application of cooling fluids for processing, and the gas and electric system for any cutting or marking torch tool, if provided. However, it will be understood that the that the control application may be split into any number of programs or applications running on a control terminal or any other local or remote computer.

The control application is programmed to move the movable clamp assembly 80 to a particular desired clamping position (i.e., a location along a portion of the workpiece 44 in the tool work zone "WZ") based on a property, properties, or characteristic of the workpiece 44 so that the clamping action is at a position that prevents the workpiece 44 from moving, bending, deforming, deflecting, etc., to an unacceptable extent when subjected to the processing forces exerted on the workpiece 44 by the processing tool. That is, the determination of the distance or length that the movable second portion 82 and the pair of opposing clamping pads 84 and 88 move along the processing path "P" into the work zone "WZ" to a desired location depends in part upon one or more characteristics or properties of the workpiece 44, such as, for example, the stiffness of the workpiece 44, the elastic modulus of the workpiece material, and/or the cross-sectional shape of the workpiece 44 in a vertical plane that is normal to the processing path "P", or any other distinguishing physical property of the workpiece 44. It will be understood that the workpiece 44 need not be uniform in cross-sectional shape along its length, and it could have a non-uniform cross-sectional shape along its length, taken in a vertical plane that is normal to the processing path "P", which would be taken into account. Furthermore, the process of the type of tools 64a, 64b, 64c and/or the forces exerted by the tools 64a, 64b, 64c on the workpiece 44 may be used (in addition to, or in place of, a property of the workpiece 44) to determine a distance that the movable clamp assembly 80 moves the clamping pads 84 and 88 into the work zone "WZ". Furthermore, the control application of the system 40 is configured to withdraw the clamping pads 84 and 88 from the work zone "WZ" along the processing path "P" after the process or processes have been completed on the workpiece 44 by a particular tool or tools operating in that work zone.

The inventors have found that providing the system 40 as described above, with a movable clamp assembly 80, or some portion thereof, that can move along the processing path "P" into the work zone "WZ" to limit the effective size or length of the work zone "WZ", may address a number of common problems with prior art processing systems and may reduce or minimize the likelihood of unwanted deflection or damage to the workpiece 44 during processing, especially for lightweight or thin materials. Furthermore, the system 40 may advantageously process heavier, relatively more rigid workpieces 44 (e.g., structural steel H-beams) within any location in the work zone "WZ" with or without the utilization of the movable clamp assembly 80. Thus, the movable clamp assembly 80 can be regarded as, in effect, shortening the work zone "WZ" of a particular tool (or tools) to different lengths, depending on various characteristics or properties such as, for example, the rigidity of the workpiece 44, the elastic modulus of the material of the workpiece 44, cross-sectional shape of the workpiece 44, and/or the pressures or forces associated with a particular process or tool 64a, 64b, and/or 64c being used. The distance that the movable clamp assembly 80 moves into the work zone "WZ" is variable and can be controlled by the control application according to location pre-sets determined by prior calculation or experiment for a particular workpiece 44 and/or tool(s).

In addition to the increased flexibility or range of workpieces 44 able to be processed by the system 40, the inventors have further found that the system 40 may perform processes on a workpiece 44 more efficiently by reducing the number of positions along the processing path "P" that the workpiece 44 must be stopped for all processing to be completed as compared to prior art systems discussed above.

According to one way of operating the system 40, an operator of the system 40 will use the control software application running on a control terminal (not visible in FIG. 1) for the system 40 to start a processing job. The parameters of the processing job can be determined in the application by the operator, or more preferably, can be created in the application by loading an existing CAD/CAM file (or any other virtual representation of the workpiece and the features to be cut or marked into the workpiece) for the particular workpiece to be processed. When the CAD/CAM file is loaded, a graphical representation of the workpiece may be displayed by the application. The programmable logic controller (PLC) system or application is then provided with the basic information of the workpiece, such as shape (e.g., H-beam, I-beam, L-beam, channel, etc.), size, thickness, material, length, etc. The PLC application uses this information to prepare the system 40 for the particular workpiece. For the example discussed herein, a lead portion of a workpiece 44 (illustrated generically as a solid, elongate beam in FIGS. 1-4) is loaded onto the support surface 48 such that a right side surface of the workpiece 44 is located on a right side of the processing path "P", a left side surface of the workpiece 44 is located on a left side of the processing path "P", and a central portion of the workpiece 44 extends between the left and right side surfaces. Furthermore, the PLC application controls the loading position of the workpiece 44 and hydraulic pressure for the first and second roller feed clamp assemblies 50 and 54. Hydraulic pressures are determined, at least in part, on the workpiece characteristics or properties such as material, stiffness, thickness and/or shape, etc. The illustrated preferred embodiment of the system 40 includes at least a tool 64a in the form of a drill spindle located on the right side of the of the processing path "P" for drilling and/or milling features in the right side surface of the workpiece 44, a tool 64b in the form of a drill spindle located on the left side of the of the processing path "P" for drilling and/or milling features in the left side surface of the workpiece 44, and a tool 64c in the form of a vertical drill spindle located above the of the processing path "P" for drilling and/or milling features in the central portion of the workpiece 44. Each of the tools 64a, 64b, 64c may include a station or tool changer for holding a variety to drill bits, milling bits, or other attachments as needed by the tools.

In this example, only the operation of the movable clamp assembly 80 and the tool 64c for drilling into the central portion of the workpiece 44 will be discussed. It will be understood that the other tools 64a and 64b would operate in a similar manner, albeit in a different orientation. Referring now to FIGS. 1 and 2, with the workpiece 44 clamped in system 40, its length generally extends along the processing path "P". The upwardly-facing surface of the middle portion of the workpiece 44 generally resides in an X-Z plane (FIG. 1) with the X-axis extending substantially parallel to the processing path "P" and a Y-axis extending normal to the X-Z plane toward and away from the upwardly-facing surface of the middle portion of the workpiece 44. The tool 60c is capable of moving in along the X-axis and Z-axis within the work zone "WZ" and along the Y-axis toward and away from the upwardly facing surface of the middle portion of the workpiece 44.

After the operator is finished preparing the process job in the control software application, and after the workpiece 44 has been positioned on the support surface 48 and clamped within the feed rollers 50 and 54, the processing job may be started by initializing the PLC system when the operator presses a physical start button. The leading end or portion of the workpiece 44 is conveyed forward along the processing path "P" until the workpiece 44 leading end is detected (such as by a laser light or mechanical switch), and the workpiece 44 is driven further forwardly by the PLC system a predetermined distance based on the size, shape, and length of the workpiece 44. Specifically, the rolling surfaces of the feed roller clamp assemblies 50 and 54 are hydraulically driven against the top and bottom surfaces of the workpiece 44 to align the workpiece 44 against a datum. An encoder wheel may make rolling contact with a surface of the workpiece 44. With the encoder wheel in contact with the workpiece 44, the workpiece 44 is moved further forwardly by the feed roller clamp assemblies 50 and 54 until a sufficient leading length of the workpiece 44 is extended into the work zone "WZ" of the processing tools 64a, 64b, and 64c to accommodate the desired (i.e., programmed) processing (i.e., cutting, marking, drilling, etc.) at a first location of a feature (e.g., bolt hole, profile, layout marking).

With reference to FIG. 3, with a first portion of the workpiece located within the work zone "WZ", the movable clamp assembly 80 is actuated such that its movable second portion 82 carries the clamping pads 84 and 88 some distance into the length "L" of the work zone "WZ", which is about 500 millimeters in this example. In this example, only the modulus of elasticity of the material of the workpiece 44 is used to determine the distance that the movable second portion 82 carries the clamping pads 84 and 88 along and into the length "L" of the work zone "WZ" to support the portion of the workpiece 44 located therein. If the workpiece 44 is made of steel, for example, then for a given process to be performed by the tool 64a, the clamping pads 84 and 88 might only move a short distance along a fraction of the length "L" in the work zone "WZ", or even not move at all into the work zone "WZ". If the workpiece 44 were made of aluminum or wood, for example, then for the same process to be performed by the tool 64a, the clamping pads 84 and 88 might move a longer distance into the work zone "WZ", even extending along the entire length "L" of the work zone "WZ" (as is shown in FIG. 4) (so long as one or more side of the workpiece 44 were accessible to the processing tool). The hydraulic actuator 87 fixed to the stationary first portion 81 drives or pushes the movable second portion 82 of the movable clamp assembly 80 along the first set of rails 83 to carry the clamping pads 84 and 88 to the desired distance into the work zone "WZ".

With reference now to FIG. 4, the clamping pads 84 and 88 are then brought toward one another to clamp the top surface and bottom surface of the portion of the workpiece 44 located within the work zone "WZ". This is effected by the actuation of the hydraulic actuator 89 fixed to the movable second portion 82, which moves the clamping pads 84 and 88 toward one another along the second set of rails 85. With the portion of the workpiece 44 that is within the work zone "WZ" secured between the clamping pads 84 and 88, the tool 64c may drill any number of holes in the X-Z plane within the middle portion of the workpiece 44. It will be understood that for some processes, the other tools 64a and 64b may be simultaneously performing processes within the work zone "WZ" if there is sufficient exposure of the of the top and bottom surfaces of the workpiece 44 that may extend beyond the clamping pads 84 and 88.

The tool 64a, described above, can work in the same manner with other tools, such as a milling bit, marking or cutting torch, etc. for creating various features in the workpiece 44 (e.g., bolt holes, cut profiles, marking, milling, etc.). During operation of the system 40, the application builds a process tree for each sequential process (e.g., cutting, drilling, marking, etc.) to be performed on the workpiece 44 to create these features. The operator may manually adjust, in the application, the particular processing tool 64a, 64b and/or 64c to be used and/or disable one or more processes from being performed. The application then generates and sends motion instructions for one or more of the processing tools 64a, 64b and/or 64c, movable clamp assembly 80, and the feed roller clamp assemblies 50 and 54 to create features in the workpiece surfaces (top surface, bottom surface, and/or central portion).

Small scrap material that is removed from the workpiece 44 may fall beneath the work zone "WZ" of the system 40 and may be conveyed away by the system 40 or otherwise removed by the operator.

With reference to FIGS. 3 and 4, when the movable clamp assembly 80 is no longer needed to clamp the workpiece 44 within the work zone "WZ", the program actuates the hydraulic cylinder 89 on the movable portion 82 of the movable clamp assembly 80 to move the clamping pads 84 and 88 away from one another along the second set of rails 85 and out of contact with the surfaces of the workpiece 44. The hydraulic cylinder 87 located on the stationary portion 81 of the movable clamp assembly 80 is then actuated to retract the movable second portion 82 along the first set of rails 83, carrying the clamping pads 84 and 88 in the opposite direction along the processing path "P" and out of the work zone "WZ".

Following the processing of the trailing portions of the workpiece 44, the workpiece 44 is then moved entirely to the outlet of the system 40 by the feed roller clamp assemblies 50 and 54, and thereafter the workpiece 44 is removed from the outlet of the system 40 such as by being conveyed onto a mating conveyor, lifted by a forklift or crane, transfer table, etc. (not illustrated).

It will be understood that in one broad form of the invention, the movable clamp assembly may be provided alone, for subsequent installation within a system for processing a workpiece.

It will be readily apparent from the foregoing detailed description of the invention and from the illustrations thereof that numerous variations and modifications may be effected without departing from the true spirit and scope of the novel concepts or principles of this invention.

What is claimed is:

1. A system for processing a workpiece, said system comprising:
   (A) a support surface for supporting a workpiece, said support surface defining a processing path along which a workpiece may travel relative to said system;
   (B) at least one tool for performing a process on the workpiece, said at least one tool movable in a work zone along a predetermined length of the workpiece in a direction along said processing path; and
   (C) a movable clamp assembly having at least a pair of opposing clamping pads, at least one of said pair of clamping pads movable relative to the other one of said pair of clamping pads for clamping a portion of the workpiece within said work zone of said at least one tool, said clamping pads movable into and out of said work zone along said processing path, whereby said movable clamp assembly is configured to move said clamping pads along said processing path into said work zone to clamp a portion of the workpiece located in said work zone prior to said at least one tool performing a process on the workpiece.

2. The system in accordance with claim 1 in which a force applied by said at least one tool while performing a process on said workpiece is used to determine a distance that said movable clamp assembly moves said clamping pads along said processing path into said work zone and clamp a portion of the workpiece located in said work zone prior to said at least one tool performing a process on said workpiece.

3. The system in accordance with claim 1 wherein said at least one tool is a drill tool.

4. The system in accordance with claim 1 wherein said at least one tool is a cutting tool.

5. The system in accordance with claim 1 wherein said at least one tool is a marking tool.

6. The system in accordance with claim 1 wherein said predetermined length is between about 250 millimeters and about 1000 millimeters.

7. The system in accordance with claim 1 wherein said predetermined length is about 500 millimeters.

8. The system in accordance with claim 1 wherein said movable clamp assembly is configured to move said clamping pads in a direction along said processing path out of said work zone subsequent to said at least one tool performing a process on said workpiece.

9. The system in accordance with claim 1 in which said at least one tool has the form of a plurality of tools located adjacent to a plurality of surfaces of a workpiece in said work zone.

10. The system in accordance with claim 1 in which said at least one tool is movable in directions along at least two orthogonal axes and is further movable in a direction substantially normal to said processing path.

11. The system in accordance with claim 1 in which said at least one tool has the form of three tools for performing processes on a workpiece, and said three tools are movable within three coextensive work zones along said predetermined length of said workpiece along said processing path.

12. The system in accordance with claim 1 further comprising a first roller feed clamp assembly for clamping a leading portion of a workpiece and a second roller feed clamp assembly for clamping a trailing portion of a workpiece, and said movable clamp assembly is located along said processing path between said first and second roller feed clamp assemblies.

13. The system in accordance with claim 1 wherein said support surface does not extend into said work zone, and each one of said pair of opposing clamping pads has the form of an elongate plate that defines a distal end including a support extending laterally inwardly toward said processing path.

14. The system in accordance with claim 1 wherein one of said pair of opposing clamping pads is spaced further from said processing path than the other one of said pair of opposing clamping pads.

15. The system in accordance with claim 1 in which a property of the workpiece is used to determine a distance that said movable clamp assembly moves said clamping pads along said processing path into said work zone to clamp a portion of the workpiece located in said work zone prior to said at least one tool performing a process on the workpiece.

16. The system in accordance with claim 15 in which said property of the workpiece is at least one of a stiffness of the workpiece, an elastic modulus of a material of the workpiece, or a cross-sectional shape of the workpiece in a plane normal to said processing path.

17. The system in accordance with claim 1 wherein said movable clamp assembly comprises a stationary first portion connected to a movable second portion by a first set of linear rails, said pair of opposing clamping pads connected to said movable second portion by a second set of linear rails extending in a direction normal to said first set of linear rails.

18. The system in accordance with claim 17 wherein said movable second portion is hydraulically movable relative to said stationary first portion in a direction along said processing path, and said pair of opposing clamping pads are hydraulically movable relative to one another in a direction normal to said processing path.

19. A method for processing a workpiece, said method comprising the steps of:
   (A) acquiring the system as set forth in claim 1;
   (B) loading a workpiece onto said support surface;
   (C) moving the workpiece along said processing path to locate a portion of said workpiece in said work zone;
   (D) moving said clamping pads along said processing path to locate at least part of said clamping pads in said work zone;
   (E) moving at least one of said clamping pads relative to the other one of said clamping pads to clamp said portion of said workpiece located in said work zone; and
   (F) performing a process with said at least one tool on said portion of said workpiece clamped in said work zone.

20. The method in accordance with claim 19 wherein said step (D) is dependent upon the process to be performed in step (E).

21. The method in accordance with claim 19 wherein step (E) includes engaging said clamping pads with less than the entire length of said portion of said workpiece that is located in said work zone.

22. The method in accordance with claim 19 wherein said step (D) is dependent upon a property of said workpiece.

23. The method in accordance with claim 22 further wherein said property of said workpiece includes at least one of a stiffness of the workpiece, an elastic modulus of a material of the workpiece, or a cross-sectional shape of the workpiece in a plane normal to said processing path.

24. A movable clamp assembly for use on a system for processing a workpiece, the system of the type having a support surface for supporting a workpiece, the support surface defining a processing path along which a workpiece may travel relative to the system and said system having at least one tool for performing a process on the workpiece, said at least one tool movable in a work zone along a predetermined length of the workpiece in a direction along said processing path, said movable clamp assembly comprising:
   at least a pair of clamping pads, at least one of said pair of clamping pads movable relative to the other one of said pair of clamping pads for clamping a portion of the workpiece within said work zone of the at least one tool, said clamping pads movable into and out of said work zone along said processing path, whereby said movable clamp assembly is configured to move said clamping pads along said processing path into said work zone to clamp a portion of the workpiece located in said work zone prior to said at least one tool performing a process on the workpiece.

\* \* \* \* \*